(12) United States Patent
Ansley et al.

(10) Patent No.: US 7,038,776 B1
(45) Date of Patent: May 2, 2006

(54) POLARIMETER TO SIMULTANEOUSLY MEASURE THE STOKES VECTOR COMPONENTS OF LIGHT

(75) Inventors: David A. Ansley, Nokomis, FL (US); Robert B. Herrick, Rancho Palos Verdes, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 11/089,899

(22) Filed: Mar. 25, 2005

(51) Int. Cl.
*G01J 4/00* (2006.01)

(52) U.S. Cl. .................................... 356/364
(58) Field of Classification Search ........ 356/364–369; 359/64, 489, 502
See application file for complete search history.

(56) References Cited

U.S. PATENT DOCUMENTS

| | | | | |
|---|---|---|---|---|
| 5,038,041 A | * | 8/1991 | Egan ........................... | 250/349 |
| 5,247,176 A | * | 9/1993 | Goldstein ................. | 250/338.1 |
| 5,365,340 A | * | 11/1994 | Ledger ........................ | 356/504 |
| 5,408,321 A | * | 4/1995 | Paulson, Jr. ................ | 356/366 |
| 5,517,306 A | * | 5/1996 | Yakubovich et al. ....... | 356/459 |
| 6,043,887 A | | 3/2000 | Allard et al. | |
| 6,229,599 B1 | | 5/2001 | Galtarossa | |

OTHER PUBLICATIONS

Schneider Optics, "Xenoplan Bilateral Telecentric", and "Xenoplan 0.95/17mm", 3 page download from www.schneideroptics.com, downloaded on Jul. 25, 2004.

* cited by examiner

*Primary Examiner*—Samuel A. Turner
*Assistant Examiner*—Isiaka O. Akanbi
(74) *Attorney, Agent, or Firm*—John E. Gunther; Leonard A. Alkov; Karl A. Vick

(57) ABSTRACT

A polarimeter simultaneously measures the Stokes vectors of a light beam using an optics unit with a slit with a slit axis, a foreoptics that focuses the light beam from the point location through the slit, a collimator that receives the light beam from the slit and collimates the light beam, a cylinder lens that receives the light beam from the collimator, wherein the cylinder lens has a cylindrical axis parallel to the slit axis, a re-imaging lens that images the light beam from the cylinder lens onto a focal plane, and a set of polarizing filters including three polarization filters having three different polarizations. The polarization filters are adjacent to each other in a direction perpendicular to the slit axis and lie between the cylinder lens and the focal plane so that the light beam is directed onto the set of polarizing filters.

20 Claims, 2 Drawing Sheets

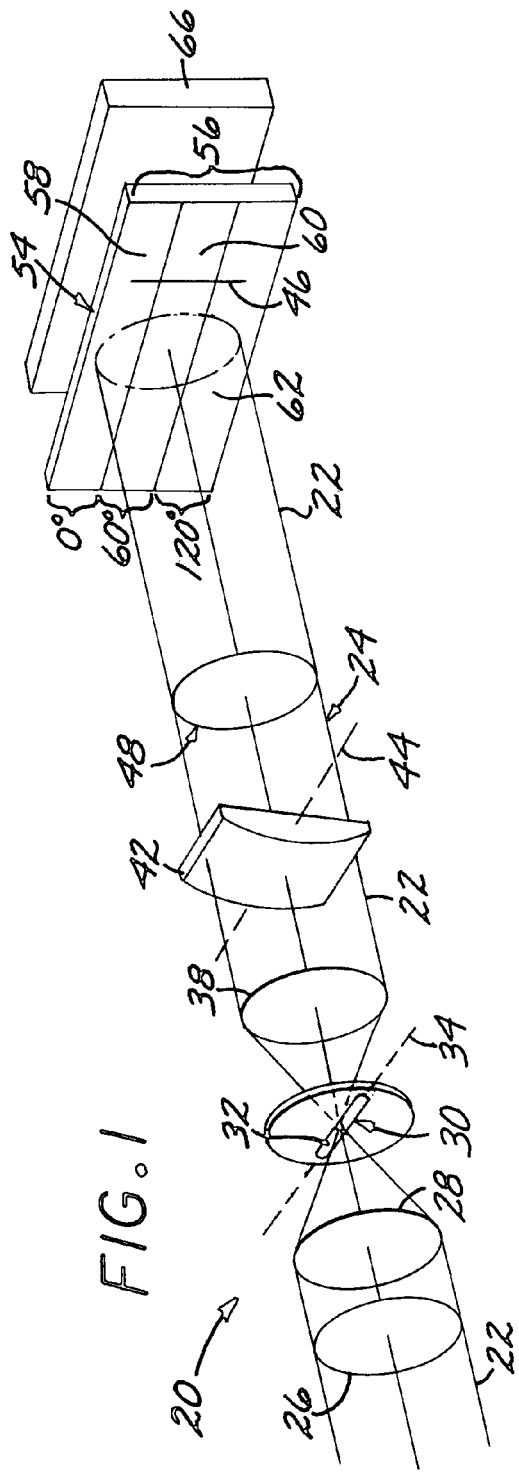
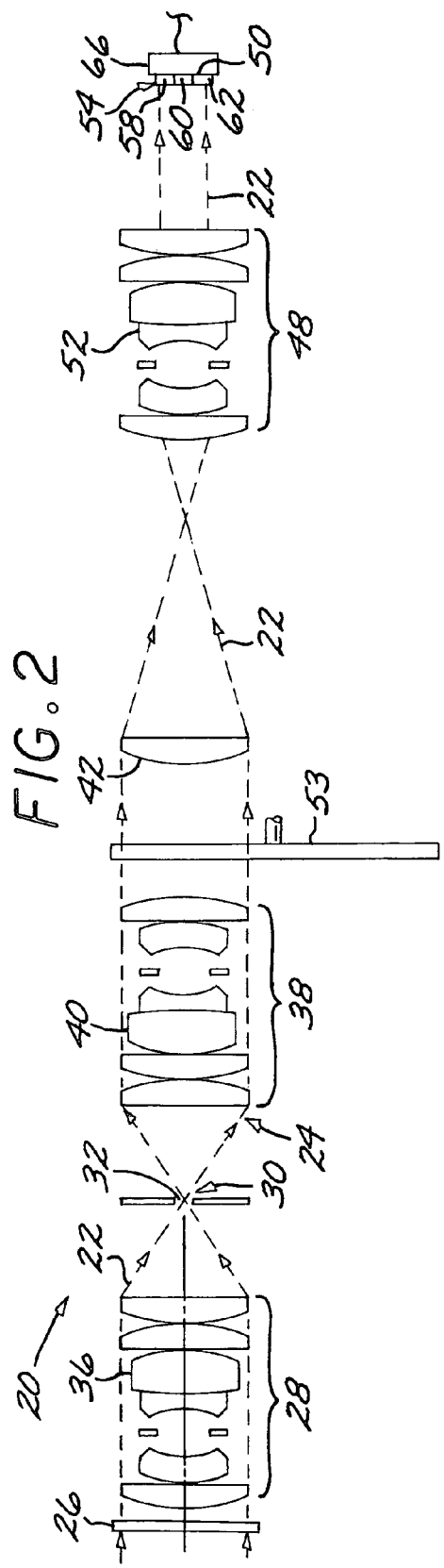

POLARIMETER TO SIMULTANEOUSLY MEASURE THE STOKES VECTOR COMPONENTS OF LIGHT

This invention relates to polarimetry and, more particularly, to an apparatus that simultaneously determines multiple Stokes vectors of a light beam.

BACKGROUND OF THE INVENTION

A knowledge of the polarization state of a light beam is useful in a number of applications. For example, in natural resources monitoring the details of wave structures near a shoreline may be understood more clearly by viewing an image near the shoreline in its different polarization states, as compared with the unpolarized image. In another example, a man-made object has a different polarimetric appearance than a natural object. The polarization state may therefore be used to distinguish a man-made object from a natural object in military applications such as the detection of camouflaged objects.

The polarization state of light may be specified by four observable quantities, termed its Stokes Vector. To evaluate the light according to the components of its Stokes Vector, the light beam must be sampled at least three times, with appropriate polarizers.

Polarimeters are available to perform the polarimetric analysis of the light beam that forms the image. Where the light output from the scene, and the relation between the scene and the detector, are nonvarying or vary only slowly with time, the different polarization states of the light beam may be sequentially sampled. In many situations, however, sequential sampling is insufficient, either due to the motion of the platform carrying the polarimeter or due to the rapid variation of the scene, or both. For example, if the polarimeter is in an aircraft or spacecraft that passes over the scene, or if the scene changes rapidly, the light beam constantly changes. Any delay between sequential samplings of the different polarization states makes it difficult to compare the images in their different polarization states.

Simultaneous Stokes Vector polarimeters have been developed to allow polarimetric analysis in such situations. In one approach, three or four separate polarizing imaging systems allow the simultaneous imaging of the scene in its different polarization states. While operable, such an apparatus is bulky and expensive, and the different simultaneously obtained images may be difficult to compare because of small natural variations in the registrations of the optical systems, such as small variations in the focal lengths of the three or four imaging polarimeters. In another approach, different micropolarizers may be placed over adjacent pixels of the imaging detector along with a micro lens to diffuse the incoming optical beam so that it falls equally on all detectors. While operable, the spatial resolution of the detector is significantly reduced. The light beam may be defocused in one direction, again with an associated loss of spatial resolution.

There is a need for a better approach to polarimetric analysis of time-varying light beams. The present approach fulfills this need, and further provides related advantages.

SUMMARY OF THE INVENTION

The present invention provides a polarimeter which simultaneously determines the polarization-state components of each individual pixel of an image. From this information, the polarized images may be formed, and compared as may be appropriate. The present approach not only achieves the simultaneous formation of the points in the image in their different polarization states, but has an excellent signal-to-noise ratio.

In accordance with the invention, a simultaneous Stokes Vector polarimeter for a light beam from a point location of a scene comprises an optics unit having a slit with a slit axis, a foreoptics that focuses the light beam from the point location through the slit, a collimator that receives the light beam from the slit and collimates the light beam, a cylinder lens that receives the light beam from the collimator, wherein the cylinder lens has a cylindrical axis parallel to the slit axis, a re-imaging lens that images the light beam from the cylinder lens onto a focal plane, and a set of polarizing filters including three polarization filters having three different polarizations. The light beam is directed onto the set of polarizing filters. The polarization filters are adjacent to each other in a direction perpendicular to the slit axis. The polarization filters lie next to the focal plane. The optics unit may also include a spectral filter through which the light beam passes, to select desired wavelengths for polarimetric analysis.

In a preferred embodiment, the foreoptics comprises a foreoptics xenoplan lens, the collimator comprises a collimator xenoplan lens, and the re-imaging lens comprises a re-imaging xenoplan lens. Typically, a detector such as a focal plane array detector is positioned at the focal plane of the re-imaging lens. The detector may be selected for any operable wavelength or wavelength range, such as visible-light, ultraviolet light, or infrared light. The set of polarizing filters may include exactly three polarizing filters, or exactly four polarizing filters. The present apparatus is not a spectrometer, and therefore the optics unit preferably has no prism and no diffraction grating therein. However, a filter wheel containing a number of spectral filters may be placed between the collimator lens and the re-imaging lens to perform multispectral polarimetric analysis.

The polarimeter may also include a platform upon which the optics unit is mounted. The platform may be, for example, a motor-driven platform, an aircraft, or a spacecraft. The polarimeter is mounted so that the platform may move the optics unit in a direction perpendicular to the slit axis. The optics unit obtains polarimetric data in a direction parallel to the slit axis, so that the movement perpendicular to the slit axis allows two-dimensional polarimetric images of an area to be developed.

The present polarimeter allows simultaneous co-registered polarimetric images to be obtained along the length of the slit or at a single point. Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIG. 1 is a schematic perspective view of the optics unit of the polarimeter;

FIG. 2 is a schematic elevational view of a preferred embodiment of the optics unit;

DETAILED DESCRIPTION OF THE INVENTION

Figure 3:
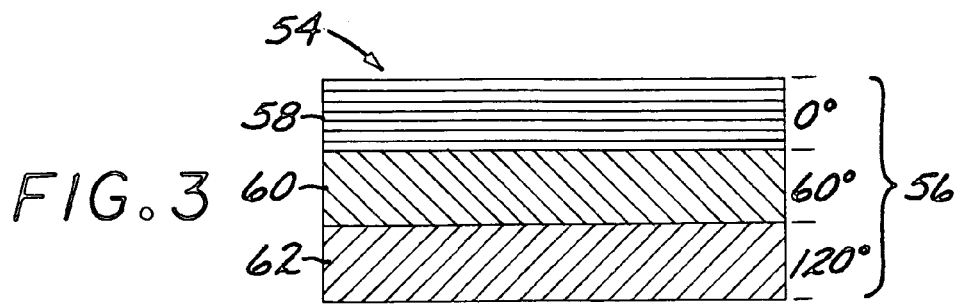
FIG. 3 is a schematic view of a set of polarizing filters.

FIGS. 1 and 2 depict a simultaneous Stokes Vector polarimeter 20 for a light beam 22 originating from a point location of a scene. The polarimeter 20 comprises an optics unit 24. The optics unit 24 is illustrated as using refractive optical components, but its elements could be implemented with reflective optical components as well, or with combinations of reflective and refractive optical components. The optical components of the optics unit 24 are described in the order in which the light beam 22 passes through them, from left to right in the views of both FIG. 1 and FIG. 2. In FIG. 1, lenses are shown schematically as a single lens, while in FIG. 2 entire lens structures are illustrated.

The light beam 22 first passes through an optional spectral filter 26, that transmits only the wavelengths of interest for the subsequent polarimetry. The spectral filter 26 may pass visible, ultraviolet, or infrared light, and either broad or narrow wavelength ranges or specific wavelengths within these broad ranges. The spectral filter 26 is preferably the first optical component of the optics unit 24 through which the light beam 22 passes, but it may also be positioned between the foreoptics and the reimaging lens, at any other operable location in the light path.

A foreoptics 28 focuses the light beam 22 from the source point location through an aperture 30. The aperture 30 is preferably a slit 32 with a slit axis 34 extending lengthwise along the slit 32. The foreoptics 28 may be of any operable type, but it preferably includes a foreoptics xenoplan lens 36 as illustrated in FIG. 2. A xenoplan lens was selected for the lens 36, as well as for other lenses discussed below, because the xenoplan lens is designed to provide a single focal length of all wavelengths of light between 400 and 1000 nanometers. Standard lenses, including high-quality camera lenses, do not have this capability. The opening of the xenoplan lens iris may also be locked into place via a set screw which is not possible with other lenses.

The slit 32 selects a spatial slice of the light beam 22 that is one pixel high, termed a column, for subsequent optical processing.

A collimator 38 receives the focused light beam 22 after it has passed through the slit 32. The collimator 38 is an optical array that collimates the light beam 22 to form a nearly parallel light beam 22 once again. The collimator 38 may be of any operable type, but preferably includes a collimator xenoplan lens 40 as illustrated in FIG. 2.

A cylinder lens 42 receives the light beam 22 from the collimator 38. The cylinder lens 42 has a cylindrical axis 44 lying parallel to the slit axis 34. The cylinder lens 42 having its cylindrical axis 44 parallel to the slit axis 34 serves as a beam spreader that angularly spreads the light beam 22 that has passed through the slit 32 and the collimator 38 in a column direction 46 perpendicular to the slit axis 34 and the cylindrical axis 44. The cylinder lens 42 is preferably chosen so that the light beam 22 is angularly spread exactly the correct amount to be incident upon the full height of a detector array to be discussed subsequently.

A re-imaging lens 48 images the light beam 22 from the cylinder lens 42 onto a focal plane 50. The re-imaging lens 48 may be of any operable type, but it preferably includes a re-imaging xenoplan lens 52 as illustrated in FIG. 2.

Optionally, a filter wheel 53 (shown only in FIG. 2) containing a number of spectral filters may be placed between the collimator 38 and the re-imaging lens 48 to perform multispectral polarimetric analysis. The filter wheel 53 controllably inserts spectral filters into the light beam 22.

A set 54 of polarizing filters 56 lies between the cylinder lens 42 and the focal plane 50, preferably between the re-imaging lens 48 and the focal plane 50, and most preferably very close to the focal plane 50 but on the same side of the focal plane 50 as the re-imaging lens 48. The light beam 22 is directed onto the set 54 of polarizing filters 56. The set 54 of polarizing filters 56 includes three individual polarization filters 58, 60, and 62 having three different polarizations. There may be more than three individual polarization filters, and specifically four individual polarization filters. However, the use of exactly three individual polarization filters 58, 60, and 62 is preferred. The three polarization filters 58, 60, and 62 are arranged adjacent to each other in a direction perpendicular to the slit axis 34, or equivalently stated, along the column direction 46.

Figure 4:
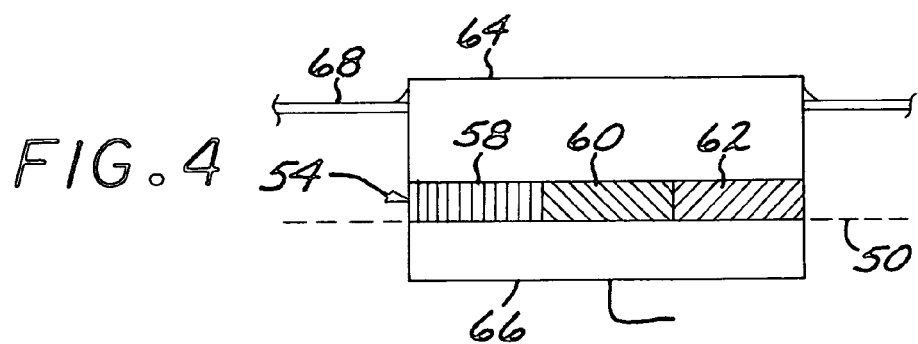
FIG. 4 is a sectional view of the set of polarizing filters integrated with a focal array plane detector.

The set 54 of polarizing filters 56 is preferably prepared as an assembly of the individual polarization filters 58, 60, and 62, as illustrated in FIG. 3 and FIG. 4. The individual polarization filters 58, 60, and 62 are prepared as flat sheets with conforming edges from polarizing material appropriate to the wavelength(s) of interest. The individual polarization filters preferably have polarization directions at 0°, 60°, and 120°. The individual polarization filters 58, 60, and 62 are then mounted in lateral contact with each other to a transparent support 64, optionally using a transparent optical cement.

Optionally but preferably, the optics unit 24 further includes a detector 66 positioned at the focal plane 50. The detector 66 may be of any operable type, such as a visible-light or infrared focal plane array detector, as may be appropriate to the specific application. Detectors 66 of various types are known in the art for other applications.

The detector 66 is preferably assembled with the transparent support 64 and the individual polarization filters 58, 60, and 62. Optical cement may optionally be used to join the polarization filters 58, 60, and 62 together. In preparing this assembly, the rows of the individual polarization filters 58, 60, and 62 are aligned with the rows of the pixels of the detector 66. In the embodiment of FIG. 4, this assembly is affixed to an opening in a mask 68 that prevents stray light from reaching the detector 66.

Figure 5:
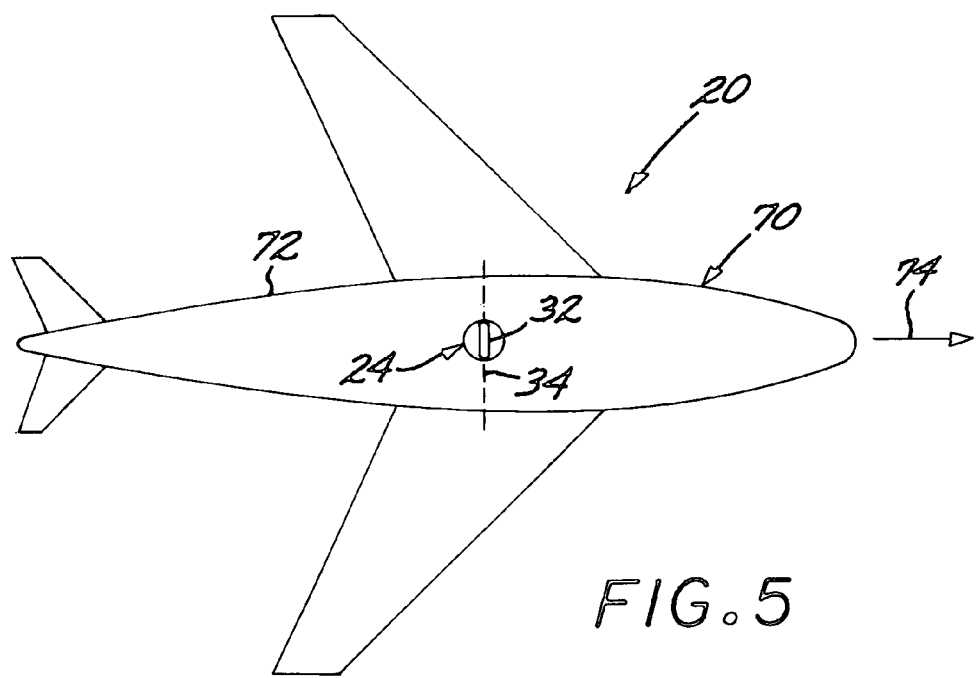
FIG. 5 is a plan view of the optics unit mounted to a platform.

The polarimeter 20 also typically includes a platform 70 upon which the optics unit 24 is mounted. FIG. 5 illustrates such a platform 70, in this case an aircraft 72. The platform 70 could also be a spacecraft, or any other structure providing a mechanical movement. The platform 70 is capable of moving the optics unit 24 in a movement direction 74 perpendicular to the slit axis 34. This movement in the movement direction 74 sweeps the slit 32 over the scene, so that the combination of the imaging along the length of the slit 32 and the movement in the movement direction 74 allows a two-dimensional scene to be viewed and polarimetrically analyzed.

The invention has been reduced to practice using an optics unit 24 in which the lenses 28, 38, and 48 were fl.4 xenoplan lenses, each having an effective focal length of 17.6 millimeters. The slit 32 had a width of 17 micrometers and a length of 6.42 millimeters. The cylinder lens 42 had an effective focal length of 15 millimeters. The detector was a Texas Instruments TC245, used for visible and near-infrared light. The polarizing filters 58, 60, and 62 were oriented at 0, 60, and 120 degrees, respectively. The polarizing material was 3M HN-32 polarizer, for use in the visible light range of 400–700 nanometers. The optics unit 24 was mounted in an aircraft 72 and flown over a variety of terrain. Polarimetric images were produced as discussed above.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A simultaneous Stokes Vector polarimeter for a light beam from a point location of a scene, comprising an optics unit having:
    a slit with a slit axis;
    a foreoptics that focuses the light beam from the point location through the slit;
    a collimator that receives the light beam from the slit and collimates the light beam;
    a cylinder lens that receives the light beam from the collimator, wherein the cylinder lens has a cylindrical axis parallel to the slit axis;
    a re-imaging lens that images the light beam from the cylinder lens onto a focal plane; and
    a set of polarizing filters including three polarization filters having three different polarizations, wherein the polarization filters are adjacent to each other in a direction perpendicular to the slit axis and wherein the polarization filters lie between the cylinder lens and the focal plane so that the light beam is directed onto the set of polarizing filters.

2. The polarimeter of claim 1, further including a platform upon which the optics unit is mounted, wherein the platform is capable of moving the optics unit in a direction perpendicular to the slit axis.

3. The polarimeter of claim 1, wherein the foreoptics comprises a foreoptics xenoplan lens.

4. The polarimeter of claim 1, wherein the collimator comprises a collimator xenoplan lens.

5. The polarimeter of claim 1, wherein the re-imaging lens comprises a re-imaging xenoplan lens.

6. The polarimeter of claim 1, further including a detector positioned at the focal plane.

7. The polarimeter of claim 1, further including a visible-light focal plane array detector positioned at the focal plane.

8. The polarimeter of claim 1, wherein the optics unit has no prism and no diffraction grating therein.

9. The polarimeter of claim 1, wherein the set of polarizing filters includes exactly three polarizing filters.

10. The polarimeter of claim 1, further including a spectral filter through which the light beam passes.

11. A simultaneous Stokes Vector polarimeter for a light beam from a point location of a scene, comprising an optics unit having:
    a slit with a slit axis;
    a foreoptics that focuses the light beam from the point location through the slit;
    a collimator that receives the light beam from the slit and collimates the light beam;
    a beam spreader that receives the light beam from the collimator and angularly spreads the light beam perpendicular to the slit axis;
    a re-imager that images the light beam from the beam spreader onto a focal plane; and
    a set of polarizing filters including three polarization filters having three different polarizations, wherein the polarization filters are laterally adjacent to each other and wherein the polarization filters lie between the cylinder lens and the focal plane so that the light beam is directed onto the set of polarizing filters.

12. The polarimeter of claim 11, wherein the beam spreader is a cylinder lens having a cylindrical axis parallel to the slit axis, and wherein the polarization filters are adjacent to each other in a direction perpendicular to the slit axis.

13. The polarimeter of claim 11, further including a spectral filter through which the light beam passes.

14. A simultaneous Stokes Vector polarimeter for a light beam from a point location of a scene, comprising an optics unit having:
    a slit with a slit axis;
    a foreoptics that focuses the light beam from the point location through the slit, wherein the foreoptics comprises a foreoptics xenoplan lens;
    a collimator that receives the light beam from the slit and collimates the light beam, wherein the collimator comprises a collimator xenoplan lens;
    a cylinder lens that receives the light beam from the collimator, wherein the cylinder lens has a cylindrical axis parallel to the slit axis;
    a re-imaging lens that images the light beam from the cylinder lens onto a focal plane, wherein the re-imaging lens comprises a re-imaging xenoplan lens;
    a detector positioned at the focal plane; and
    a set of polarizing filters including three polarization filters having three different polarizations, wherein the polarization filters are adjacent to each other in a direction perpendicular to the slit axis and wherein the polarization filters lie between the re-imaging lens and the detector so that the light beam is directed onto the set of polarizing filters.

15. The polarimeter of claim 14, further including a platform upon which the optics unit is mounted, wherein the platform is capable of moving the optics unit in a direction perpendicular to the slit axis.

16. The polarimeter of claim 14, wherein the detector is a focal plane array detector.

17. The polarimeter of claim 14, wherein the detector is a visible-light focal plane array detector.

18. The polarimeter of claim 14, wherein the optics unit has no prism and no diffraction grating therein.

19. The polarimeter of claim 14, wherein the set of polarizing filters includes exactly three polarizing filters.

20. The polarimeter of claim 14, further including a spectral filter through which the light beam passes.

* * * * *